UNITED STATES PATENT OFFICE.

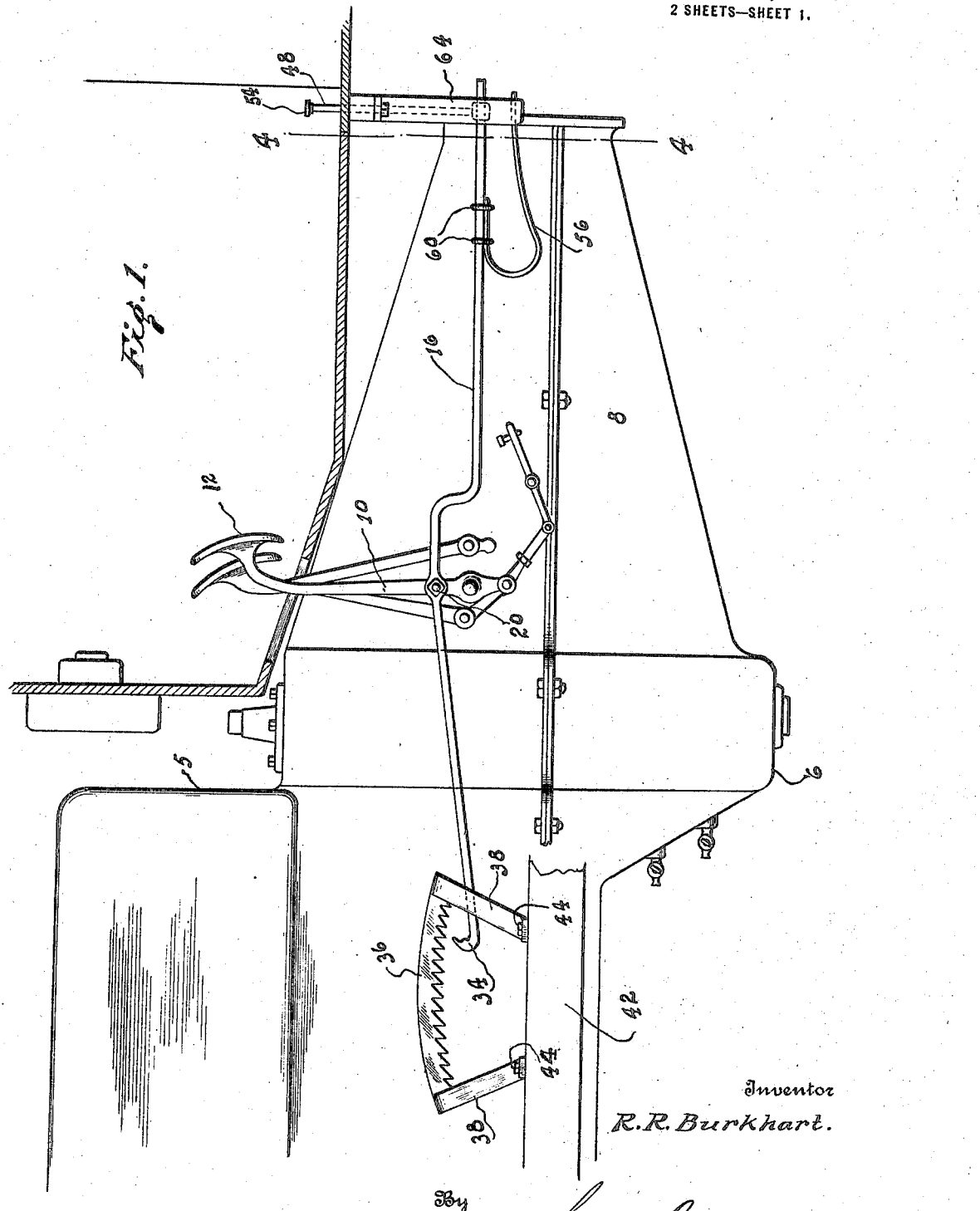

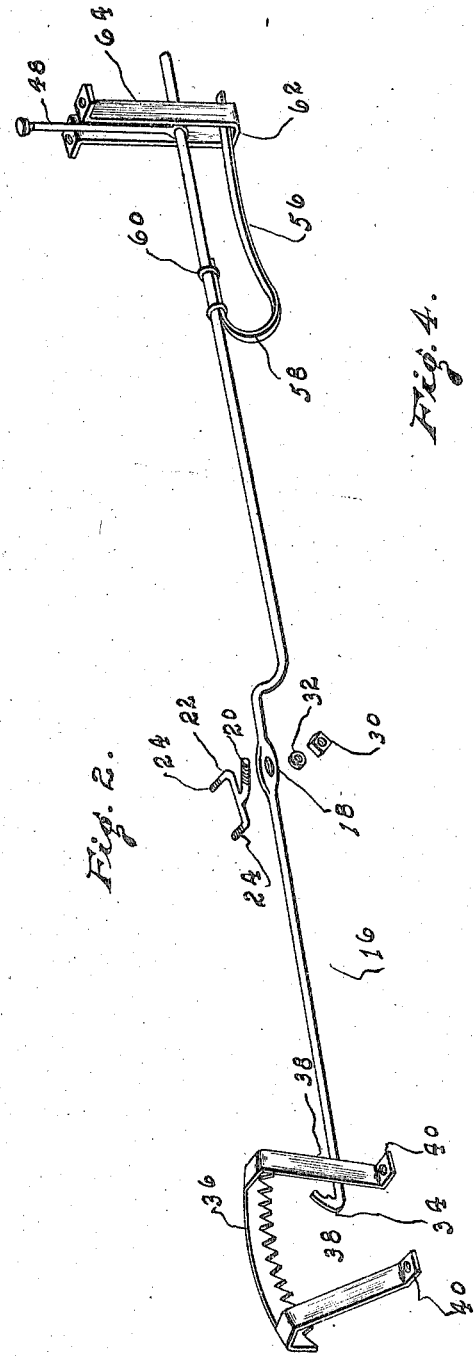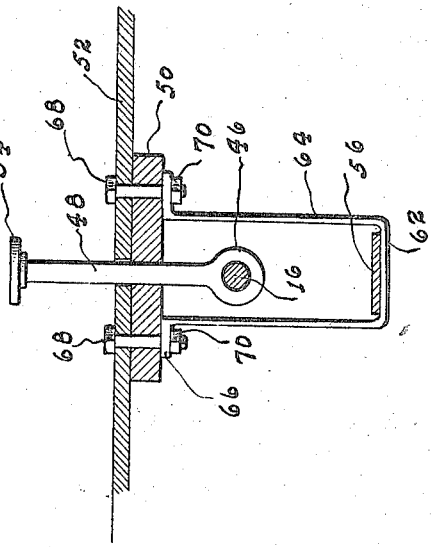

RALPH R. BURKHART, OF SPOKANE, WASHINGTON, ASSIGNOR OF ONE-FOURTH TO JOHN E. CLARK, OF SPOKANE, WASHINGTON.

CLUTCH-PEDAL LOCK.

1,417,138. Specification of Letters Patent. Patented May 23, 1922.

Application filed November 5, 1920. Serial No. 421,951.

*To all whom it may concern:*

Be it known that I, RALPH R. BURKHART, a citizen of the United States, residing at Spokane, in the county of Spokane and State of Washington, have invented certain new and useful Improvements in Clutch-Pedal Locks, of which the following is a specification.

This invention relates to locking devices especially adapted for use in connection with the clutch pedal of a planetary transmission.

As is well known, the clutch pedal of a Ford automobile must be held down or in a depressed position when it is desired to operate the vehicle in low gear for the purpose of temporarily increasing the pulling power of the same. The clutch pedal is held in depressed position by the foot against spring tension and the continued operation of the vehicle in low gear tires the foot of the operator to a great extent. Owing to the fact that the clutch pedal accidentally moves up at times the clutch or transmission becomes highly heated and wears extensively.

Also, when operating the car in low gear, the foot becomes highly heated due to the fact that the heated air from beneath the hood of the engine rushes through the opening in the floor board and strikes against the foot, thereby rendering the operator extremely uncomfortable.

The invention forming the subject matter of this application, therefore, aims to provide a simple means whereby the clutch may be mechanically locked in a depressed position so that when the vehicle is climbing a long hill or is placed under other continued strain, the operator will not have to hold his foot on the pedal during the entire time that the vehicle is operating in low gear.

A further object of the invention is to provide a locking device for clutch levers which may be readily and conveniently brought into operation when desired and which, when not in use, will not in any way interfere with the operation of the vehicle.

A further object of the invention is to provide a locking device for clutch levers which may be applied either during the manufacture of the vehicle or at any time thereafter without elaborately altering the structure of the vehicle.

A further object of the invention is to provide a locking device for clutch levers which is efficient, reliable in use and cheap to manufacture.

Other objects and advantages of the invention will be apparent during the course of the following description.

In the accompanying drawings forming a part of this application and in which like numerals are employed to designate like parts throughout the same;

Figure 1 is a side elevation of the improved locking device applied,

Figure 2 is a perspective of the same detached,

Figure 3 is a detail sectional view through the clutch pedal, the view illustrating the application of the locking lever, Figure 4 is a detail sectional view taken on line 4—4 of Figure 1.

In the drawings, wherein for the purpose of illustration is shown a preferred embodiment of the invention, the numeral 5 designates an internal combustion engine having the usual fly wheel case 6. As illustrated in Figure 1 of the drawings, a planetary transmission 8 is arranged rearwardly of the fly wheel case 6 and is provided with a clutch pedal 10 having a foot engaging surface 12. As is well known, the clutch pedal 10 is adapted to be depressed so as to cause the vehicle to which the engine is attached to run in low gear. The clutch pedal 10 is depressed against spring pressure and, therefore, under ordinary circumstances, it is necessary to hold the clutch pedal down with the foot all of the time that the vehicle is running in low gear.

The invention forming the subject matter of this application aims to provide simple means whereby the clutch pedal 10 may be held in downward position so that the operator will not be forced to hold his foot on the pedal all of the time that the vehicle is running in low gear.

The improved locking device comprises a lever 16 having its intermediate portion formed with a transverse opening 18 adapted for the reception of the pivot element 20 of an attaching member 22 which is in the form of a Y. The Y-shaped attaching member 22 comprises a pair of screw threaded arms 24 adapted to be arranged on opposite sides of the pedal 10 and secured to the pedal by means of nuts 26. A plate 28 may, however, be arranged between the nuts 26 and the pedal 10 so as to securely connect the pedal to the arms 24. A nut 30 and a washer 32 are mounted on the pivot bolt 20 and serve as a means for securing the lever 16 on the bolt.

When the clutch pedal 10 is moved forwardly or to its advanced position, the lever 16 is also drawn forwardly and the pawl 34 formed at the forward end of the lever may, by means to be later described, be engaged with the teeth on the under side of a longitudinally extending rack 36. The rack 36 has a pair of L-shaped attaching brackets 38 formed integral therewith and which have their lower portions formed with flanges 40 which may be secured to the frame 42 of the vehicle by means of fastening nuts 44. The brackets 38 serve as a means for guiding the forward portion of the lever 16 in addition to constituting an attaching means for the rack. When the laterally projecting pawl formed at the forward end of the lever is engaged with the teeth of the rack 36, the pedal 10 will be securely though detachably held in a set position. Since the teeth of the rack are formed along the entire lower edge of the rack, the pedal may be held in any desired position.

As illustrated in Figures 2 and 4, the rear end portion of the lever 16 is slidably passed through the eye 46 of a foot pedal 48. The foot pedal 48 which is provided with a cylindrical shank, is slidable through a bearing block 50 and through the floor board 52 of the vehicle. When the foot-engaging head 54 of the pedal 48 is depressed the rear end portion of the lever will also be depressed with the result that the pawl 34 will be elevated and engaged with the teeth.

The rear end portion of the lever 16 is normally held in elevated position by means of a longitudinally curved leaf spring 56 which has one end portion doubled upon itself as indicated at 58 and secured to the lever by means of fastening devices 60. The other end portion of the leaf spring 56 is engaged with the bight portion 62 of a U-shaped bracket or guiding element 64 having arms provided with laterally projecting attaching flanges 66. With reference to Figure 4 of the drawings, it will be noted that the attaching flanges 66 are secured to the bearing block 50 and to the floor board by means of screw bolts 68 having threaded engagement with nuts 70.

In the use of the improved locking device, the clutch pedal 10 may be depressed by the foot to advance the lever 16. When the clutch pedal has been depressed to the desired extent, the pedal 48 may now be depressed so as to elevate the forward portion of the lever 16 whereby the pawl 34 will be engaged with the teeth formed on the rack 36. The tension of the spring associated with the clutch pedal 10 will tend to draw the lever 16 rearwardly with the result that the pawl 34 will be securely engaged with one of the teeth of the rack 36. The foot may now be gradually withdrawn from engagement with the foot engaging surface 12 of the clutch pedal and the clutch pedal will remain in depressed position by reason of the engagement between the pawl 34 and the teeth of the rack 36. When it is desired to release the clutch pedal 10 it is merely necessary to give the same a very slight forward movement with the result that the leaf spring 56 will elevate the rear portion of the lever 16 and thereby cause the forward portion of the lever to move downwardly.

When the device is not in use it does not in any way interfere with the operation of the transmission since the pawl 34 is normally arranged in spaced relation to the rack 36.

Having thus described the invention, what is claimed as new is:

1. A lock for clutch pedals comprising a lever having means whereby it may be pivoted intermediate its ends upon the side of a clutch pedal, a locking member associated with the forward end of said lever, means acting on the rear end of the lever normally spacing the forward end thereof from said locking member, and a setting member slidably engaged with the rear end of the lever.

2. A lock for clutch pedals comprising a lever having means whereby the same may be pivotally connected to a clutch pedal, a locking member associated with the forward end of said lever, and a leaf spring associated with the rear end of said lever and adapted for normally spacing the forward end of said lever from said locking member.

3. A lock for clutch pedals comprising a lever having means whereby the same may be connected intermediate its ends to a clutch pedal, means associated with the forward end of the lever for securing the lever in an adjusted position, an operating pedal having an eye slidably receiving the rear end portion of said lever, a guide arranged adjacent said operating pedal, and a spring arranged adjacent the rear end of said pedal and connected to the same and said guide for normally spacing the forward end of said lever from said means.

4. A lock for clutch pedals comprising a lever having means whereby the same may be connected intermediate its ends to a clutch pedal, a rack associated with the forward end of said lever, an operating pedal having an eye slidably receiving the rear end portion of said lever, a bearing block having an opening slidably receiving said operating pedal, a U-shaped bracket having flanges connected to said bearing block, and a leaf spring connected to the rear end portion of said lever and said bracket for normally spacing the forward portion of said lever from said rack.

5. A lock for clutch pedals comprising a lever having an opening intermediate its ends, an attaching member having a pivot bolt extended through said opening and provided with a pair of spaced arms adapted for engagement with a clutch pedal, a rack associated with one end of said lever, and an operating pedal connected to the other end of said lever.

In testimony whereof I affix my signature.

RALPH R. BURKHART. [L. S.]